Patented Sept. 5, 1944

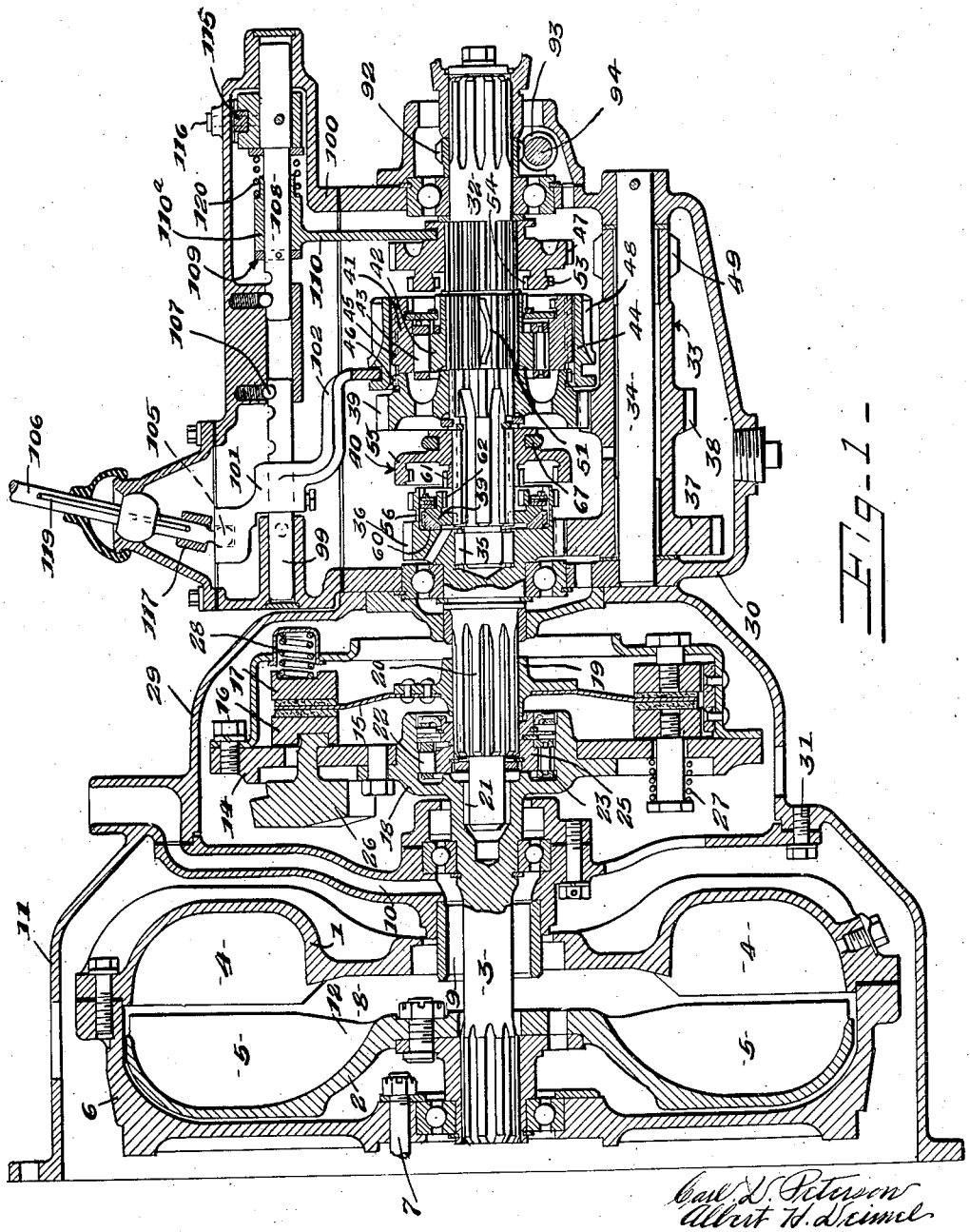

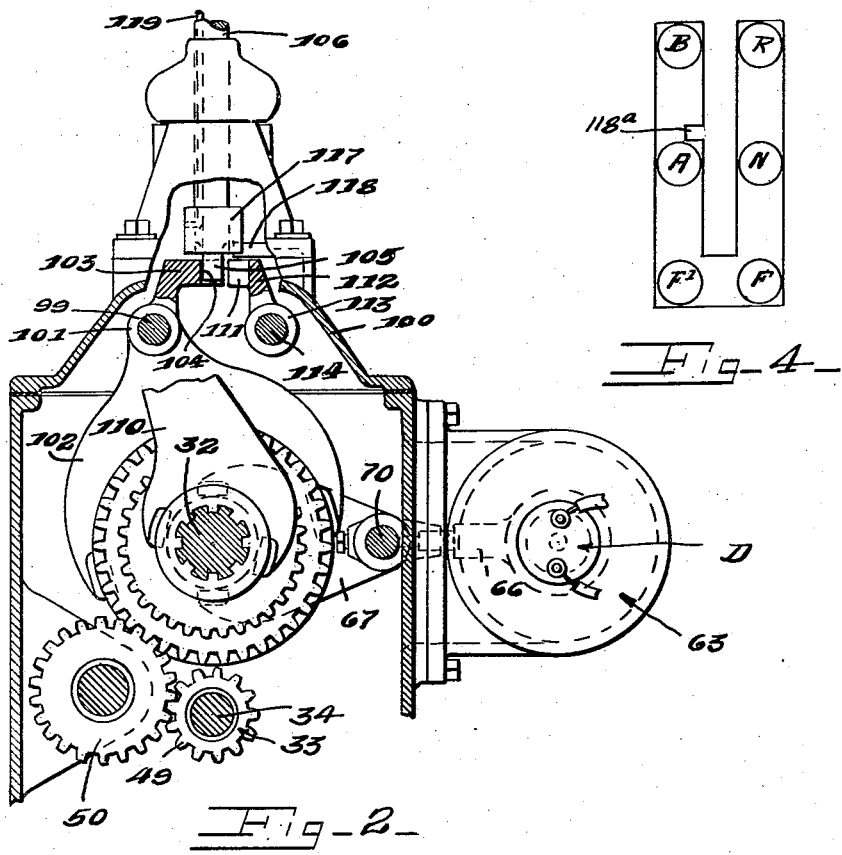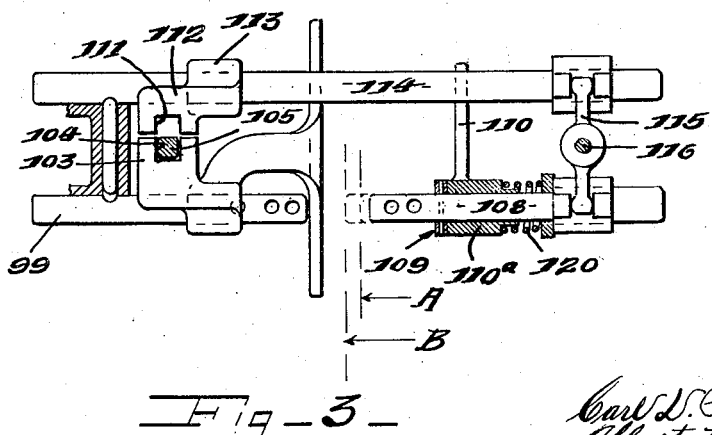

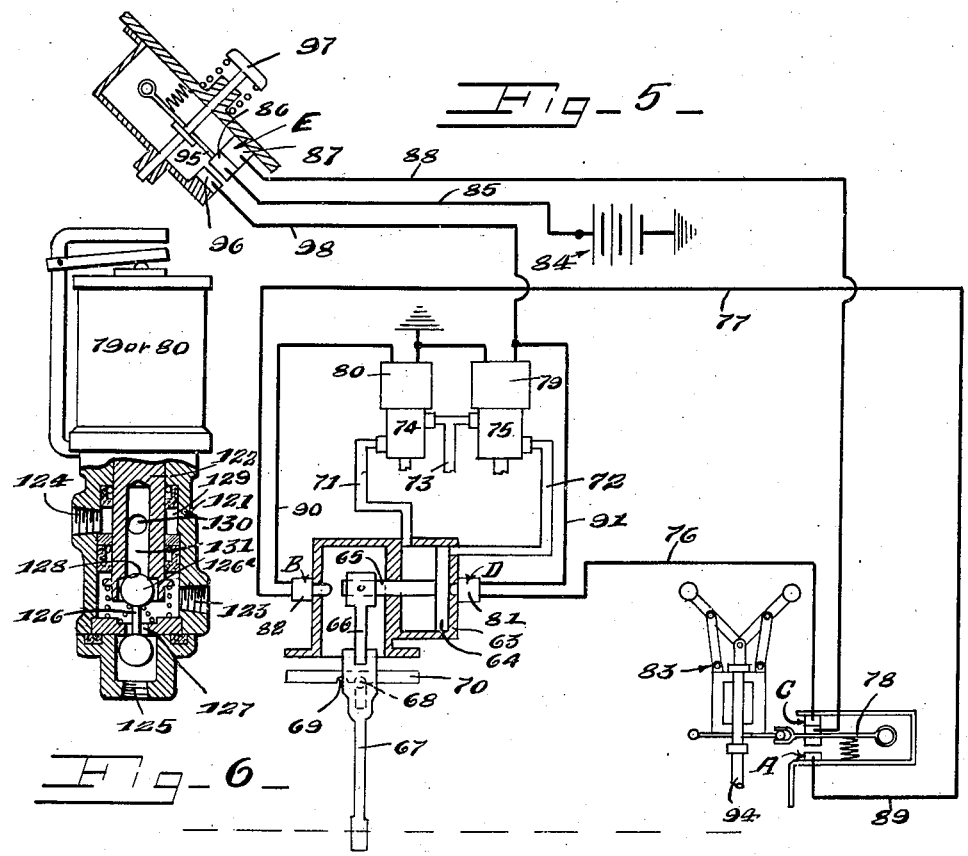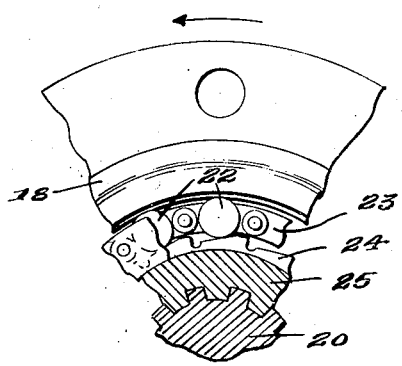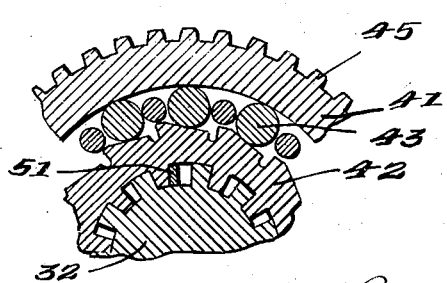

2,357,284

UNITED STATES PATENT OFFICE 2,357,284

POWER TRANSMISSION MECHANISM

Carl D. Peterson and Albert H. Deimel,
Toledo, Ohio

Application January 28, 1942, Serial No. 428,598

3 Claims. (Cl. 192—3.5)

This invention relates to power transmission mechanisms, particularly applicable for transmitting the engine power to the drive wheels of the vehicle at different speeds, and has for its object an automatic transmission, whereby the speed changes are effected automatically from a low forward speed into a higher forward speed, and vice-versa, also a transmission mechanism in which the speed changes can be made, particularly from a higher speed to a lower speed by the driver at any time.

It further has for its object a transmission mechanism which is actuated through an automatic speed operated or centrifugal clutch, the driving member of which is connected to the gearing or the input shaft thereof through a one-way clutch, which permits over-running of the driving member relative to the drive or input shaft of the gearing in a forward direction but which serves to permit the input shaft to actuate and start the driving member of the speed controlled clutch, when the speed is below clutch-engaging rate and the vehicle in motion, for the purpose of actuating the driving member of the clutch to crank the engine, as when the starter fails to work, and the vehicle is being drawn or pushed, or when coasting, and the engine is dead.

It further has for its object a power transmitting mechanism as outlined above in which the power of the engine is transferred through a coupling having slip characteristics, as a hydraulic coupling, coupled to the driving member of the clutch.

It further has for its object a power transmission mechanism embodying a change speed gearing including a forward gear train, as the low gear train, which transfers the power through an over-running clutch, so that when in higher gear ratios, the output shaft of the gearing over-runs the first gear train, in which gearing is provided means for locking the over-running clutch from operation, particularly when the engine is to be cranked through the first gear train through the disengaged speed operated clutch, it being disengaged because the speed is not great enough to automatically engage it.

It further has for its object an output speed control power system for effecting the shifting, particularly from low to a higher gear and from the higher gear to low gear, the control system being automatically controlled by the output speed of the gearing, the control system further including a driver operated control for effecting the shifts, particularly from the higher gear to a lower gear at any output speed, more especially when the output speed is greater than a predetermined low speed at which the shifts automatically take place.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of the transmission mechanism embodying a hydraulic coupling, a speed operated or centrifugal clutch, a change speed gearing.

Figure 2 is a fragmentary vertical sectional view, parts being omitted.

Figure 3 is a detail view of an operator shifting mechanism for shifting into neutral and reverse and also for shifting to lock out over-running clutch between the first speed train and the output shaft.

Figure 4 is a diagrammatic view illustrating the movement of the handle end of the shifting lever.

Figure 5 is a diagrammatic view of the power system for automatically effecting the shift into and from a higher gear ratio and from and into the low gear ratio, and the control system for the power system.

Figure 6 is a detail view, partly in section, of one of the control valves in the power system.

Figure 7 is a fragmentary detail, partly in section, of the over-running clutch automatically controlled or the centrifugal clutch.

Figure 8 is a detail sectional view of the over-running clutch in the first gear train to permit the output shaft of the gearing to over-run when the drive is through a higher gear ratio.

By "automatic speed operated clutch" is meant a clutch which engages to transmit power at a predetermined speed or R. P. M. and remains engaged above that predetermined speed and disengages when decelerated to and below the predetermined low speed. Such clutches usually operate on the centrifugal principle and embody centrifugal weights.

By "over-running clutch" is meant a one-way clutch which drives only in one direction and permits over-running of the driven member or shaft relative to the driver. These one-way clutches are usually of the roller and cam type, and sometimes are called roller clutches and free-wheeling clutches.

In the illustrated embodiment of this power transmission mechanism, the engine power is shown as transferred to the driving member of the clutch through a hydraulic coupling. This transmission mechanism, in its entirety, is here illustrated as comprising generally a hydraulic coupling, an automatic speed operated or centrifugal clutch, the driving member of which is actuated by the runner of the coupling, a change speed gearing, the input shaft of which is actuated by the driven member of the centrifugal clutch, the change speed gearing embodying a shiftable element, as a clutch, for connecting the input and output shafts of the gearing together in a higher gear ratio, and power operated output speed controlled means or system for effecting the shifting of the shiftable element or clutch from a low to a higher gear ratio and from the higher gear ratio and back to the low speed ratio, and also driver operated control for effecting the shift from the higher gear to the lower gear ratio at any time, regardless of the speed. The output shaft of the gearing is driven through the low gear train including a gear connected to the output shaft through an over-running clutch.

The transmission mechanism further includes shifting means operable to lock the over-running clutch of the gearing from over-running. The lock-out means is also a part of the reverse gear train of the gearing.

The hydraulic coupling comprises an impeller 1 and a runner 2, the latter being mounted upon a runner shaft 3. The hydraulic coupling is here shown as of the radial vane type, the impeller having vanes 4 and the runner, vanes 5; the impeller also having a housing or section 6 enclosing the runner 2. This housing or section 6 is connected or coupled, as by bolts 7, to the fly wheel on the engine shaft, not shown, or to a flange in the engine shaft.

The coupling here shown is formed with a central chamber 8 between the runner 2 and impeller 1, which chamber communicates through a passage 9 at the center of the coupling with a stationary conduit 10, which conduit communicates with a stationary outside tank, not shown. Also, the vanes 5 of the runner 2 extend farther at 12 into the chamber 8 than the impeller vanes 4, for the purpose of facilitating partial emptying of the coupling, when the runner 2 is held stationary, and also the refilling of the coupling when the impeller is free to rotate. The construction of the coupling forms no part of the invention.

14 designates the driving member of the automatic speed control or centrifugal clutch, and 15 the driven member, disk or plate of the clutch. 16 and 17 are pressure rings rotatable with the driving member 14 and between which the friction facings on the driven disk or plate 15 extend. The drive member has a hub 18 suitably secured to the runner shaft 3 to rotate therewith, it being here shown as an integral head on the runner shaft 3. The driven member or plate 15 has its hub 19 splined on the input shaft 20 of the transmission gearing. This shaft 20 is alined with the runner shaft and has a pilot bearing 21 therein. The hub 18 of the driving member is mounted on the input shaft 20 through a one-way, over-running or roller clutch which permits the driving member 14 to over-run the input shaft 20 in a forward direction, that is, clockwise when viewed from the left end of Figure 1.

In this transmission mechanism, this permits the input shaft to crank the engine through the driving member of the clutch, when the driving member is stationary or the engine dead.

22 (Figures 1 and 7) designates the rollers of the over-running clutch mounted in a suitable cage 23 and interposed between the internal cylindrical surface of the hub 18 and the cams 24 of the cam wheel 25 splined on the input shaft 20.

26 designates one of the centrifugal weights on the driving member 14. As these weights are thrown outwardly by the centrifugal force, they thrust the pressure ring 16 against the driven member or plate 15, against the action of suitable returning springs 27 and clamp the friction plate against the pressure ring 17, which is spring-pressed by springs, as 28. When a certain predetermined rotative speed of the driving member 14 is attained, the centrifugal weights 26 create enough pressure on the pressure ring to transfer the power through the plate 16 to the input shaft 20, all as is well understood. The speed operated or centrifugal clutch is enclosed in a suitable housing 29 secured to the gear box 30 and to the housing 11 as by screws 31.

32 designates the output shaft of the gearing. 33 is a gear cluster constituting the countershaft of the gearing, this cluster being mounted upon a stationary shaft 34 mounted in a gear box parallel to the output shaft 32. The output shaft 32 is here shown as alined with the input shaft 20 and as having a pilot bearing 35 therein.

The forward gear trains between the input shaft 20 and output shaft 32 comprises a gear 36 on the input shaft 20 meshing with a gear 37 of the cluster 33, a gear 38 also part of said cluster meshing with a gear 39 mounted on the output shaft 32, the gear 39 being rotatable about the shaft 32 but connected thereto through an over-running clutch. The other forward gear train is a direct drive ratio through a synchronizing clutch on the output shaft 32 and designated generally 40. The over-running clutch between the first speed gear 39 and the output shaft 32 is here shown as of the roller type and comprises an outer race 41 and an inner cam wheel 42 (see Figure 8) and rollers 43 between the race 41 and the cam wheel, and also a slidable clutch gear 44 interlocked with external splines 45 on the outer race 41 and shiftable into interlocking engagement with clutch teeth 46 on the first speed gear 39, and being normally engaged with the clutch teeth 46, but shiftable out of engagement therewith into neutral position and also into interlocking engagement with a clutch section or collar 47 splined on the output shaft 32. This clutch gear 44 has external gear teeth 48 which constitute a gear of the reverse train.

The reverse gear train comprises a gear 49 of the cluster 33 which meshes with a reverse idler gear 50 (Figure 2) suitably mounted in the gear box at one side of the cluster, and the clutch gear 44. The gear teeth 47 of the clutch gear 44 are normally out of mesh with the idler and are in mesh therewith when the clutch gear 44 is shifted to the right (Figure 1) to unclutch the gear 39 through neutral position and into position to interlock with the clutch collar 47. The cam wheel or sleeve 42 is splined to the output shaft 32 with back lash on the coast side, and a spring or springs are located between a spline tooth on the shaft and a spline in the cam wheel or sleeve 42 to maintain the cam sleeve against the coast side of the splines, while the vehicle is free wheeling. As seen in Figures 1 and 8, 51 designates the spring, this being shown as a form of bow spring having its ends located in notches formed in one of the internal splines of the cam sleeve. In order to provide sufficient space for the spring, one of the splines of the shaft 32 is recessed or removed and the bowed part of the spring is located in the recess. As seen in Figure 8, this spring maintains the cam sleeve 42 against the coast side of the splines of the shaft 32, while the vehicle is free wheeling.

The lock-out collar or section 47 is also shiftable axially as to the left (Figure 1) from its normal position to interlock clutch teeth 53 and 54 with complemental clutch teeth on the cam sleeve 42 and the outer race 41 to lock the free wheeling clutch from operation, when the gearing is in first or low speed, this operation being utilized during cranking of the engine while the vehicle is dead.

To start in a forward direction with the engine idling, the driving and driven members 14, 15 of the speed controlled or centrifugal clutch remain disengaged. As the motor speeds up to a predetermined speed, say five hundred to six hundred R. P. M., the centrifugal clutch engages, and power is transmitted through the hydraulic coupling and the centrifugal clutch and the low speed gear train consisting of gears 36, 37, 38, 39.

To operate in a reverse direction, the engine is decelerated to idling speed and a driver controlled or operated shifting lever, shifted to reverse position, and the engine accelerated. As the motor speeds up to the predetermined R. P. M., the centrifugal clutch engages, and power is transmitted through the hydraulic coupling, centrifugal clutch and reverse gear train consisting of the gear 49, reverse idler 50 and the clutch gear 44, which has been shifted into mesh with the gear 50. The shifting from first to high speed forward is an automatic operation which will now be described.

The automatic shifting is controlled by the output speed of the vehicle which controls the shifting of the balking ring clutch 40. The balking ring clutch 40 comprises a toothed section 55 splined on and shiftable axially of the output shaft 32 and a toothed section 56, which is shown as integral with the gear 36, and a balking ring 59 rotatable with the section 55 and here shown as splined to the output shaft 32, and as coacting with a friction ring 60 rotatable with the clutch section 56. The balking ring is capable of a rocking or locking movement relative to the shaft 32, and hence relative to the clutch section 55. The section 55 is provided with balking teeth 61 which slidably fit passages 62 in the balking ring. As is well understood, in balking ring clutches, when the speeds of the parts to be clutched together are different, the balking ring 59 is rocked, and such rocking brings the passages 62 out of alinement with the balking teeth 61, and then as the speeds cross by slowing down of the driving section, the balking ring is dragged therewith, due to the frictional engagement of the balking ring with the ring 60, until the passages 62 aline with the balking teeth 61, permitting complete shifting-in. The rocking of the balking ring is an unlocking and locking action. The balking ring is permitted to rock, because the teeth thereof that interlock with the splines on the shaft 32 are of less width than said splines. As the construction and operation of balking ring clutches are well known, further description is thought to be unnecessary.

The shifting of the clutch section 55 is by power automatically controlled by the output speed of the gearing.

In the illustrated embodiment of our invention, the power shifting mechanism is power operated and comprises a motor having a reversely movable motor member, which is connected to the clutch section 55, the power system including branches through one of which the power is supplied to the motor to effect the shift in one direction, or up to the higher gear ratio, and through the other of which the power is supplied to effect the shifting out of the higher gear ratio into a low gear ratio, control members in the branches respectively, and normally in position in which both branches are idle, and a power operated control system controlled by the output speed of the gearing including branches, a control device in each branch for operating respectively the control devices in the branches of the power shifting system, and additional control devices in the branches of the control system and alternately operable by the movable member of the motor, and a centrifugal governor operated by the output speed of the gearing to effect the flow of power through one or the other of the branches of the control system to effect the shifting into and out of the higher gear ratio. The clutch section 55 is held in its shifted position subject to being shifted by the power, by suitable means, as the usual spring-pressed poppets acting on shifters or shift rods.

In the illustrated embodiment of the invention, the reversely movable motor is pressure operated and comprises a chamber, as a cylinder 63, having a piston 64 therein, the rod 65 of which is connected by an arm 66 and fork 67 to the shiftable clutch section 55. The clutch section is held in either of its operated positions by any suitable means, as spring-pressed poppet 68 coacting with notches 69 in the guide rod 70 along which the hub of the fork slides. The motor is a vacuum one and the power operated shifting system comprises two branches 71, 72 connected to a source of vacuum, as the intake manifold engine of the vehicle through a conduit 73. 74 and 75 designate the control devices in the branches 71, 72 respectively, and as this is a pressure motor, these control devices are valves. The branches 71, 72 open into the cylinder 63 at opposite ends thereof or on opposite sides of the piston 64. The power operated control system, in this embodiment of the invention, is shown as electrical, and the flow of electric power therethrough or through the branches thereof is controlled by switches, one of which is controlled by the output speed of the transmission gearing. 76 and 77 designate respectively the branches of the electrical system controlled by the output speed controlled switch 78. 79 and 80 designate electro-responsive devices as magnets or solenoids in the branches 76 and 77 respectively for operating the valves 74 and 75. 81 and 82 are control devices or switches connected in the branches 76 and 77 respectively in series with the electro-responsive devices or magnets 79 and 80. Normally with the engine running above idling speed sufficient to engage the centrifugal clutch, the vehicle is in first speed forward. Upon acceleration of the engine, the vehicle will proceed in first or low gear forward, and when the vehicle attains a predetermined speed, say of fifteen to twenty M. P. H., the switch 78 is shifted by the centrifugal governor 83 until it breaks contact with terminal C and closes the circuit at terminal A (Figure 5), so that the current passes from the source 84 through wire 85, contacts 86, 87 of a switch, to be presently described, wire 88, to the terminals of the switch arm 78, through terminal A, thence through wire 89 to switch 82, which is closed, thence through wire 90 to the windings of the magnet 80, energizing the same and operating the valve 74 to open the branch conduit 71 to the action of the vacuum in the pipe 73, so that the piston 64 is pulled to the left (Figure 5), effecting the shift of the clutch section 55 to the left (Figure 1). The clutch section 55 is, as the speeds are different, balked by reason of the balking teeth 61 abutting against the balking ring. However, upon deceleration of the engine, the speeds cross, so that eventually the balking ring rocks out of locking position, thus alining the passages 62 thereof with the balking teeth 61, permitting the shifting-in to be completed by the power, that is, permitting the clutch teeth of the two sections 55, 56 to interlock. As the final shifting-in is completed, the piston rod 65 encounters the operating arm or button of the switch 82 and opens the switch 82, thus de-energizing the magnet 80 and permitting the valve 74 to return to its normal position, so that the vacuum is cut off. During this movement of the piston 64 to the left by the vacuum through the branch 71, the valve 75 is in normal position, permitting atmospheric air to pass through the valve and the pipe 72 back of the piston 64, and hence press it to the left, as the portion of the cylinder 63 at the left of the piston is being evacuted through the branch 71. The poppet 68 holds the clutch in its shifted position. As the output speed decreases to and below fifteen to twenty M. P. H., the switch 78 will assume its position in Figure 5, in which it is engaged with the contact C so that now the current passes as before, from the battery through wires 85, contacts 86, 87, branch 88, switch arm 78, contact C, branch 76 to the switch 81, which is open, by reason of the piston 64 being located in the left end of the cylinder 63, thence through wire 91, through the windings of the electro-magnet 79 which operates the valve 75 to open the branch conduit 72 to the influence of the vacuum in the pipe 73, and upon release of the throttle to increase the vacuum, the piston 64 will move from the left end position to the right, and finally assume the position in Figure 5, and in so doing, shift the fork 67 in the clutch section 55 into normal position, whereby the drive is through the low gear train. When the piston assumes its extreme position to the right, as seen in Figure 5, the piston encounters the button or operating member of the switch 81 to open said switch 81. The centrifugal governor 83 may be of any suitable construction, and as here shown, is operated from the output shaft through a worm gear 92 (Figure 1) on the output shaft coacting with a worm 93 on the governor 94. The governor may be actuated in any suitable manner, as by the output speed of the gearing or the speed of the vehicle.

If it is desirable at any time the vehicle is in high gear to shift back to low gear for additional power, the driver operated switch may be operated, this being the switch 95 carrying the contact 86 and operable to carry the contact 86 out of engagement with the contact 87 into engagement with the contact 96, the switch arm being operated by a suitable member or button 97 located usually on the toe board of the vehicle within convenient reach of the driver's foot.

Assuming that the clutch section 55 is now in high gear position, and it is desired to shift back into low gear, upon depression of the operating member 97, the terminals 86, contacts of the terminals 96, so that the current is from source 85, terminals 86, 96, through the wires 98, through the windings of the electro-magnet 79, which controls the valve 75, causing said valve to open the conduit branch 72 to the vacuum through the pipe 73, so that the throttle may be released momentarily and create sufficient vacuum to return the piston 64 to the right hand end of the cylinder 63, and shift the clutch section 55 to its "out" position. The transmission gearing is now in the low gear train.

The shifting of the clutch gear from first speed position and to reverse through neutral position, and also the shifting to effect locking of the over-running or free wheeling clutch, in the first gear train, is effected by driver operated shifting mechanism. The shifting to reverse, that is, the shifting of the clutch gear 44 is, for the purpose of illustration, effected by a shift rod 99 suitably mounted in the cover 100 of the gear box and having a block 101 thereon formed with a fork 102 which coacts with the suitable groove in the clutch gear 44. The block also has an arm 103 formed with a notch 104 for receiving the finger 105 of a selecting and shifting lever 106 to be presently described.

When the lever or the handle end thereof is shifted from first speed forward position F (Figure 4) to neutral position N, the clutch gear 44 is shifted out of clutching engagement with gear 39 of the first gear train into exclusive engagement with the race 41 of the over-running clutch, and upon further movement from neutral position N to reverse position R, the clutch gear is shifted into clutching engagement with the clutch collar or section 47 splined to the output shaft 32 and the clutch gear into mesh with the reverse idler 50. The shift rods are held in shifted position by suitable spring-pressed poppets 107.

In order to use the engine of the vehicle as a brake, when in low gear, means is provided for locking the over-running or free wheeling clutch from over-running or free wheeling, and this means includes the clutch section 47, which is shiftable to the left to interlock the teeth 53 with the outer race of the over-running clutch and its teeth 54 with the inner cam wheel of the over-running clutch. This shifting of the collar or section 47 to lock the free wheeling clutch for the purpose of illustration is shown as embodying, or as effected by, a shift rod 108 (Figure 3) suitably mounted in the cover 100 of the gear box, the hub of the rod 108 having a fork 110 coacting with a suitable groove in the collar 47. The rod 108 is shifted by the selecting and shifting lever 106, the finger 105 of which coacts with a notch 111 in an arm 112 on the hub 113 fixed to a shift rod 114 suitably mounted in the cover 100 and extending parallel to the rods 99 and 108. The movement of the rod 114 is transferred to the shift rod 108 through a reversing lever 115 suitably pivoted at 116 in the cover of the gear box. The lever 106 thus has a lateral selecting movement to carry the finger 104 either to the notch 105 or 111. To shift the free wheeling lock-out collar 47, the lever 106 is moved laterally to cause the finger 104 to enter the notch 111. This operation is possible only when the gear is in first gear position and in so making the selecting movement, the handle end of the lever moves from position F (Figure 4) to position F', and then upon forward movement of the lever to position A, the rod 114 is shifted rearwardly or to the right (Figure 3) causing the shift rod 108 to shift to the left to position A (Figure 3), this bringing the teeth 54, 54 of the collar 47 into a position in which they balk on the coacting teeth of the outer race 41 and the inner cam wheel 42 of the over-running clutch.

Upon further shifting of the lever following acceleration, the one-way clutch teeth aline with the spaces of the other set of clutch teeth permitting complete shifting-in. Preferably, a suitable latch is used requiring the unlatching by the operator before a shift can be made from position A to position B or from balking position to complete shifting-in position. This latch is here shown as a sleeve 117 slidable on the lever 106 (Figure 2) and encountering the barrier 118, the latch being lifted high enough to hurdle or clear the barrier, by a rod 119 extending along the lever 108 and having a suitable button or grip handle at its upper end, not shown. However, in the event the latch is unlatched before acceleration of the engine brings about synchronization permitting complete shifting in, the shifting-in movement of the rod 108 from position A to position B (Figure 3) corresponding to positions A, B (Figure 4) is against the action of a spring 120 (Figure 4) interposed between the hub 110a of the fork 110 and a collar on the rod 108. The hub 110a of the fork 110 slidably fits the rod 103 and the hub 110a abuts against a stop or collar 109 fixed on the rod and thrust against it by the spring 120. Hence, when the shifting-in of the clutch collar 47 is balked, the rod 108 can shift, ahead of the fork 110 until the clutch teeth of the collar 47 become alined with the spaces of the clutch teeth of the outer race 41 and the inner cam wheel of the over-running clutch, whereupon the spring re-acts and completes the shift.

If the engine of the vehicle fails to start, due to failure of the starting motor, the engine may be started by pushing or pulling the vehicle by first shifting the gear shifting lever from position F' and then forward to position A to position B locking out the free wheel clutch, so that now when the vehicle is propelled, drawn or pushed, the engine will be started by cranking. At this time, the centrifugal or speed operated clutch is disengaged, but owing to the one-way clutch between the driving clutch member 14 and the input shaft 20, the engine will be cranked by the input shaft 20 being driven through low gear ratio and acting as a driver for the driving clutch section 14. When the engine starts and is accelerated to a sufficient speed to cause the centrifugal clutch to be engaged, the vehicle will be driven forward in the conventional manner. In thus cranking the engine, the runner 2 acts as an impeller and the impeller 1 as the runner. In actual practice the lever 106 is an intermediate lever actuated by a hand lever on the steering column of the vehicle and having a movement in the path shown in Figure 4. The latch 117 is located on such hand lever and the barrier 118 located at 118a (Figure 4).

The spring 51 between the splines of the cam sleeve 42 of the over-running clutch and the output shaft 32 causes the balking teeth of the outer race 41 and the cam wheel 42 to be displaced out of alinement with the balking teeth 53, 54 of the lock-out collar or clutch section 47, thereby preventing the shift of the lock-out collar 47 being made until the engine is accelerated to a point where it picks up the cam wheel 42 of the over-running clutch, and hence unlocking the balking teeth and permitting the shifting spring 120 to complete the shifting in. If the ends of the teeth abut and lock, the accelerator is released slightly in order to easily complete the shift. To again unlock the free wheeling or over-running clutch, including the outer race 41, and cam sleeve or wheel 42, the lever 106 is again shifted to F' position. The balking teeth 53, 54 of the clutch section or lock-out collar 47 and of the outer race 41 and inner cam sleeve or wheel of the over-running clutch are suitably chamfered on their ends so that the spring 51 is sufficient to prevent the shifting spring 120 from completing the shift, until the engine has been started and the vehicle is being driven, but the chamfered ends of such teeth permit forcibly rotating of the free wheel cam wheel 42. The shift is completed when the shift lever and rod 108 have moved to position B by the spring 120 which has been loaded by the shifting of the rod 108 ahead of the hub 110a of the fork, when the clutch collar has been balked in position A.

The valves 74 and 75 may be of any suitable construction, and such a valve is shown in Figure 6 including a casing 121 having a movable valve member 122 actuated by the magnet or solenoid 79 or 80. 123 designates the port connected to the cylinder 63 through the branch 71 or 72. 124 designates the port connected to the vacuum pipe 73. 125 is a port communicating with the outer air. 126 designates a combined intake and exhaust valve member. The valves 74, 75 are normally in the position shown in Figure 6. When the magnet 79 or 80 is energized, the core or member 122 is drawn upwardly, causing the valve member 126 to close the passage 127 which communicates with the outer air through port 125, and to move the seat 128 away from the valve member 126a, so that the vacuum is effective through port 124, annular chamber 129, radial passages 130, and axial passage 131, both in the movable member 122, and through the port 123 which is connected to the pipe section 71 or 72 to the cylinder 63. When the magnet 79 or 80 is de-energized, the parts are restored to their normal position, wherein the vacuum is cut off and the valve opened to the outer atmosphere through the port 125.

In the general operation, with the engine idling, the speed operated centrifugal clutch consisting of the driving and driven members 14 and 15 remains disengaged. To start the vehicle with the parts in the position shown in Figure 1, that is, with the manual lever 106 in F position (Figure 4), the vehicle is started by merely depressing the accelerator. As the motor speeds up to a predetermined speed, say from five hundred to six hundred R. P. M., the centrifugal clutch engages, and the power transmitted through the first gear train and the over-running clutch in the first gear train to the output shaft 32. When the vehicle reaches a predetermined speed in first or low speed forward, say fifteen to twenty M. P. H., the centrifugal governor 83 causes the switch arm 78 to contact at terminal A, completing the circuit through normally closed switch B and through the contacts 86, 87 of the switch E to magnet 80 of the valve 74, so that a vacuum pull is created in the cylinder 63 to the left, shifting the clutch section 55 up to the balking ring with light pressure. By momentarily releasing the accelerator to decelerate the engine, greater vacuum and pressure is also attained, and when the speeds of the two clutch sections to be brought together cross, the shifting pressure being increased by the releasing of the accelerator momentarily and deceleration of the engine. Upon the completion of the shift into the higher gear, the switch 82 is automatically opened by the piston rod 65 operating member or button thereof, thus releasing the vacuum valve 74 or permitting it to return to normal position, cutting out the vacuum, the poppet 68 holding the clutch in shifted position.

When the speed of the vehicle drops to a predetermined low, say five M. P. H., the centrifugal governor 83 causes the switch 78 to contact the terminal C, thus completing the circuit through the normally closed switch D and the magnet 79 of the value 78. Now, when the accelerator is released, sufficient vacuum is created in the cylinder 63 to pull the piston 64 to the right and disengage the clutch 55 and clutch section 56, and the vehicle is now in low gear. After this shift is completed, the switch D is opened by the piston 64 de-energizing the windings of the magnet 74 and permitting the valve 75 to cut off the vaccum. The poppet 68 holds the section 55 in shifted position.

While the vehicle is in high gear, the low speed gear is over-running, due to the over-running clutch including clutch gear 41 and inner cam sleeve 42.

If it is desirable at any time the vehicle is in high gear to shift back into low gear for additional power, the driver operated member 97 may be depressed, causing the switch member 95 to close the circuit to the contact 94, as before described. This operation closes the circuit through the windings 79 of the low speed vacuum valve 75, and on release of the accelerator momentarily, the shift is made to low gear and the vehicle remains in low gear, until this button 97 is released.

If it is desired to lock out the free wheeling unit consisting of the race 41 and inner cam wheel 42, in order to use the motor as a brake, the lever 106 is shifted to the position A with the lever 106 in position A, the free wheeling lockout clutch section 47 is brought up to balking position through the spring 120.

The engine may be started when the starting motor fails to act by shifting the lever 106 into position A, as before described, and pushing or pulling the vehicle until the engine is cranked with the input shaft 20 acting as a driver for the driving member 14 of the centrifugal clutch.

What we claim is:

1. In a transmission mechanism, the combination of a change speed gearing including an engine actuated input shaft, an output shaft, trains of change speed gears between the shafts to drive the output shaft through different gear ratios and including a reverse gearing, the first speed train of gears comprising a gear mounted on the output shaft and adapted to be connected to the output shaft through an over-running clutch permitting the output shaft to overrun the first gear train when in a higher gear ratio, a clutch gear, the over-running clutch including an outer race, an inner cam wheel rotatable with the output shaft and rollers between them, a clutch collar on the output shaft, said clutch gear being slidable axially on the outer race and movable into one position to clutch the gear of the first speed train to the output shaft through the over-running clutch and into an intermediate neutral position unclutching the gear of the first gear train and into a third position to clutch the outer race to the clutch collar and shift the gear of the clutch gear into the reverse train, and means for shifting the clutch collar into interlocking engagement with the outer race, and thereby locking the over-running clutch from over-running action.

2. In a transmission mechanism, the combination of a change speed gearing including an engine actuated input shaft, an output shaft, trains of change speed gears between the shafts to drive the output shaft through different gear ratios and including a reverse gear, the first speed train comprising a gear adapted to be operatively connected to the output shaft to drive the same through an overrunning clutch which permits the output shaft to overrun the first gear train when in a higher gear ratio, a clutch gear, a clutch collar alined with the overrunning clutch and connected to the output shaft to rotate therewith, the clutch gear being shiftable axially to clutch the overrunning clutch to, and unclutch it from the first-mentioned gear, and shiftable into position to form a gear in the reverse gearing and being further shiftable into coaction with the clutch collar to hold the overrunning clutch from overrunning when in reverse gear, and means for shifting the clutch gear and for shifting the clutch collar into position to lock the overrunning clutch from overrunning.

3. In a transmission mechanism, the combination of a drive shaft, a driven shaft, and an automatic speed operated engine clutch including driving and driven members mounted respectively on said shafts, the driving member being connected to the driven shaft through a one-way overrunning clutch permitting the driving member to overrun the driven shaft in a forward direction, when the clutch is disengaged and the driving shaft acting as a driver, a transmission gearing including the driven shaft which serves as an input shaft for the gearing, an output shaft, trains of change-speed gears between the shafts, the first speed train including a gear rotatable about the output shaft, a clutch gear connected to the output shaft through an overrunning clutch and normally clutched to said gear permitting the output shaft to overrun the first gear train when in a higher gear ratio, the clutch gear being shiftable out of interlocking engagement with said first-mentioned gear of the first gear train, a clutch collar rotatable with the output shaft and shiftable into position to lock the overrunning clutch from overrunning movement for cranking the engine through the first-mentioned overrunning clutch, and means operable to shift the clutch gear into and out of engagement with said gear of the first train and for shifting said clutch collar into position to lock the overrunning clutch from movement.

CARL D. PETERSON.
ALBERT H. DEIMEL.